United States Patent
M et al.

(10) Patent No.: US 12,182,567 B2
(45) Date of Patent: Dec. 31, 2024

(54) CODE CHANGE REQUEST MANAGEMENT AND HUMAN GATE FREE DEPLOYMENT BASED ON DATA COLLECTED FROM A DEVELOPMENT SYSTEM

(71) Applicant: Kyndryl, Inc., New York, NY (US)

(72) Inventors: Nalini M, Chennai (IN); Kalpesh Sharma, Bangalore (IN); Prasanna Holla, Bangalore (IN); Veeresh Bushetti, Savanur (IN)

(73) Assignee: Kyndryl, Inc., New York, NY (US)

( * ) Notice: Subject to any disclaimer, the term of this patent is extended or adjusted under 35 U.S.C. 154(b) by 138 days.

(21) Appl. No.: 18/122,053

(22) Filed: Mar. 15, 2023

(65) Prior Publication Data
US 2024/0311146 A1    Sep. 19, 2024

(51) Int. Cl.
*G06F 8/77* (2018.01)
*G06F 8/72* (2018.01)
*G06F 21/57* (2013.01)

(52) U.S. Cl.
CPC ............ *G06F 8/77* (2013.01); *G06F 8/72* (2013.01); *G06F 21/577* (2013.01); *G06F 2221/033* (2013.01)

(58) Field of Classification Search
None
See application file for complete search history.

(56) References Cited

U.S. PATENT DOCUMENTS

| | | | |
|---|---|---|---|
| 9,350,623 B2 | 5/2016 | Shadi et al. | |
| 10,216,509 B2 | 2/2019 | Martin Vicente et al. | |
| 2018/0314517 A1* | 11/2018 | Iwanir | G06F 21/563 |
| 2020/0110693 A1 | 4/2020 | Herrin et al. | |
| 2020/0159573 A1 | 5/2020 | Dobrev | |
| 2020/0310769 A1 | 10/2020 | Veljanoski et al. | |
| 2020/0379879 A1* | 12/2020 | Plotnik | B62H 5/142 |
| 2020/0401397 A1 | 12/2020 | Thomas et al. | |
| 2021/0042217 A1 | 2/2021 | Hwang et al. | |
| 2021/0263728 A1* | 8/2021 | Farrier | G06F 17/18 |

(Continued)

OTHER PUBLICATIONS

Pagerduty, "What is a Pull Request?" PagerDuty, 2023, 8 pages.

(Continued)

*Primary Examiner* — Lewis A Bullock, Jr.
*Assistant Examiner* — Mark A Gooray
(74) *Attorney, Agent, or Firm* — CANTOR COLBURN LLP; Dan Housley

(57) ABSTRACT

A computer-implemented method, in accordance with one aspect of the present invention, includes collecting data existing in a development system that relates to the code change request, in response to receiving a code change request to merge new code with existing code. Factors from the collected data are computed for assessing a risk of promoting the new code, the factors including at least: a developer information factor, a developer availability factor, and an environment health analysis factor. The factors are processed to compute a confidence score for the code change request. If the confidence score is in a first predefined range, the new code corresponding to the code change request is promoted for merging with the existing code, without human intervention. If the confidence score is in a second predefined range, an indication that human intervention is needed before promoting the code is output.

18 Claims, 10 Drawing Sheets

(56) References Cited

U.S. PATENT DOCUMENTS

2021/0294716 A1    9/2021    Mosquera et al.
2022/0382541 A1*  12/2022   Ren .......................... G06F 8/75
2024/0095027 A1*   3/2024    Fanning ................... G06F 8/77

OTHER PUBLICATIONS

Wikipedia, "Distributed version control," Wikipedia, 5 pages, 2023.
Red Hat, "What is a CI/CD pipeline?" Red Hat, May 11, 2022, 11 pages.
Wikipedia, "Git," Wikipedia, 25 pages, 2023.
Git, "git—distributed—even—if—your—workflow—isnt," git, 2023, 3 pages.
Wikipedia, "GitHub," Wikipedia, 25 pages, 2023.

* cited by examiner

| | Change analysis - type of code | Developer profiling | Test results analysis | Speed to react - availability analysis | Security scan & compliance analysis | Environment Health analysis | Results |
|---|---|---|---|---|---|---|---|
| Developer A | Passed | Passed | Passed | Passed | Passed | Passed | Confidence High - direct promotion |
| Developer B | Passed | Passed | Passed | Failed | Passed | Passed | Confidence moderate - conscious promotion |
| Developer C | Failed | Passed | Passed | Passed | Passed | Failed | Confidence moderate - manual intervention needed |
| Developer D | Passed | Failed | Failed | Passed | Failed | Failed | Confidence low - manual intervention needed |

FIG. 6

| Bucket Name | Change Analysis | Developer Characteristics | Test Results Analysis | Speed to react | Security Compliance | Infrastructure Health Analysis | Capacity Forecasting | Defects/Incidents/Alerts/Events |
|---|---|---|---|---|---|---|---|---|
| Actors | | | | | | | | |
| Developer 1 | Positive | Negative | Positive | Positive | negative | Risk Based | Neutral | Neutral |
| Product Manager | Negative | Negative | Positive | Positive | negative | Risk Based | Neutral | Neutral |
| Tester 1 | Riskbased | Negative | Positive | Positive | negative | Risk Based | Neutral | Neutral |
| DevOps Engineer 1 | No-decision | Negative | Positive | Positive | negative | Risk Based | Neutral | Neutral |
| Developer 2 | Positive | Negative | Positive | Positive | Risk Based | Risk Based | Neutral | Neutral |
| Tester 2 | Positive | Positive | Positive | Positive | Risk Based | Risk Based | Neutral | Neutral |
| DevOps Engineer 2 | Positive | Positive | Positive | Positive | Risk Based | Risk Based | Neutral | Neutral |
| Attributes | | | | | | | | |
| | Change in requirements on the module | Role | No. of test cases executed, passed, failed | Availability of the resources | Vulnerabilities | Anomaly detection | Auto scaling feature | New critical defects |
| | Regression prone | Years of experience | Quality of test cases | Working Hours | Static code analysis | Open events | Devops related changes | High impactful incident |
| | Complexity | Experience in the project | No. of scenarios identified - Modules based | Ability to rollback / Restore | open source scan | Health scoring | BOM Updates | Threat communication |
| | No. of modules affected | Skills expertise | Coverage of the test cases | | Image scanning | Metric/ KPI Trends | | |
| | No. of lines code change | code check-ins count | Scenarios aligned w/ requirements and expectations | Availability of maintenance window | Code Quality | Observability | | |
| | | No. of defects reported - Module wise | Quality of delivery - Production defects reported Module based | | | Outages - Planned/Unplanned | | |
| | Code Conformance | No. of Modules worked | test trends | | | Critical issues | | |
| | Type of code change - Proactive/Reactive | No. of modules moved to production | | | | | | |
| | Client approval for change | Similar modules worked in current and previous org | | | | | | |
| | Type of code launch | No. of PRs raised | | | | | | |
| | | Quality of code delivered - Reviews | | | | | | |
| | | No. of reviews conducted and review comments | | | | | | |
| | | Pull request status | | | | | | |

FIG. 8

CODE CHANGE REQUEST MANAGEMENT AND HUMAN GATE FREE DEPLOYMENT BASED ON DATA COLLECTED FROM A DEVELOPMENT SYSTEM

BACKGROUND

The present invention relates to code change request management, and more specifically, this invention relates to enabling human gate free promotion of new code corresponding to a code change request based on analysis of data collected from a development system.

Software and firmware are ubiquitous in today's society. However, issues sometimes arise, whereby supplemental and/or replacement code is merged with the existing code of the software or firmware to change the existing code in some way that resolves the issue.

Production deployment of code to resolve a software or firmware issue currently must go through multiple stages, lengthy approvals, and manual gatekeeping prior to deployment of the code that will resolve the issue.

In a typical workflow, a developer prepares the new code that will resolve the issue, and after unit testing, the code is pushed to the code base. A quality assurance team runs a regression suite, and manual testing as applicable, prior to approving the changes effected by the new code. After the quality assurance team approves the changes, a development team, which acts as the gatekeeper before production, reviews the new code. Such review often includes meetings to allow collaboration between members of the team, answering of questions, and time for all necessary parties to provide their input. Once the development team approves the new code, the new code is promoted to the production environment, where it is deployed to the target software or firmware. Overall, this procedure is time consuming and requires much manual effort. The resultant long delay between new code generation and actual deployment thereof is known to cause increased turnaround time for critical bug fixes, often results in capital loss, and other problems known in the art.

While gatekeeping is important to any development environment in terms of quality assurance, there is a need to reduce or eliminate the inherent delay associated with human gatekeeping.

SUMMARY

A computer-implemented method, in accordance with one aspect of the present invention, includes collecting data existing in a development system that relates to the code change request, in response to receiving a code change request to merge new code with existing code. Factors from the collected data are computed for assessing a risk of promoting the new code, the factors including at least: a developer information factor characterizing the developer of the new code, a developer availability factor characterizing an availability of the developer, and an environment health analysis factor characterizing a health of a production environment of the existing code. The factors are processed to compute a confidence score for the code change request. In response to the confidence score being in a first predefined range, the new code corresponding to the code change request is promoted for merging with the existing code, without human intervention. An indication that human intervention is needed before promoting the new code is output in response to the confidence score being in a second predefined range.

The foregoing method significantly reduces the time between submitting a code change request and promotion of the new code for deployment. For example, by leveraging intelligence derived from within the development system, the human gatekeeping process can be eliminated for some code change requests based on a high confidence score. Accordingly, the inherent delays of such human gatekeeping process are avoided. In other cases where the confidence score is lower because the risks are higher, the normal process can be used, e.g., a production team performs a gatekeeping process to assess the new code prior to promotion.

In one approach, in response to deciding to promote the new code, a timing for promoting the new code is selected based at least in part on data corresponding to the developer availability factor and the environment health analysis factor. Thus, in various aspects, not only is the code quality assessed, but the best recommended maintenance window to promote the code is determined, based at least in part on the health of the system and developer availability.

In further approaches, the collected data includes data corresponding to a previous code change request. This historical data can be used to influence promotion of the present new code. This learning and loopback preferably continues for all new code change request, and all the new code change requests get influenced by the previous history along with newly computed factors, thereby improving the accuracy of the confidence score.

In further approaches, the new code is promoted to only one particular geographical area for a predetermined period of time before promotion to other geographical areas. This way, in case the new code causes any issues after deployment, promotion of the new code to the other geographical areas can be suspended.

In preferred approaches, the factors include labeled data. A filter gate is used to filter out items of the labeled data that have a label indicating the item has no impact on the confidence score prior to computing the confidence score. This reduces the processing required when computing the confidence score, thereby reducing resource usage and making the overall computer system operate more efficiently.

A computer program product, in accordance with another aspect of the present invention, includes a computer readable storage medium having program instructions embodied therewith. The program instructions are executable by a computer to cause the computer to perform the foregoing method.

A system, in accordance with yet another aspect of the present invention, includes a hardware processor and logic integrated with the processor, executable by the processor, or integrated with and executable by the processor. The logic is configured to perform the foregoing method.

A computer-implemented method, in accordance with yet another aspect of the present invention, includes collecting data existing in a development system that relates to the code change request, in response to receiving a code change request to merge new code with existing code. Factors from the collected data are computed for assessing a risk of promoting the new code, the factors including at least: a developer information factor characterizing a developer of the new code, a developer availability factor characterizing an availability of the developer, and an environment health analysis factor characterizing a health of a production environment of the existing code. The factors include labeled data. Items of the labeled data that have a label indicating the item has no impact on a confidence score are filtered out prior to computing the confidence score. The factors are processed to compute the confidence score for the code change request. In response to the confidence score being in a first predefined range, a decision is made to promote the new code. In response to deciding to promote the new code, a timing for promoting the new code is selected based at least in part on data corresponding to the developer availability factor and the environment health analysis factor. The new code corresponding to the code change request is promoted according to the selected timing for merging with the existing code, in response to selecting the timing to promote the new code. Moreover, the new code is promoted to only one particular geographical area for a predetermined period of time before promotion to other geographical areas. If the confidence score is in a second predefined range, an indication that human intervention is needed before promoting the new code is output in response to the confidence score being in the second predefined range.

This method provides many of the same benefits presented above, including allowing suspension of promotion of the new code to the other geographical areas can be suspended if issues after the first deployment of the new code are detected. Moreover, the filtering reduces the processing required when computing the confidence score, thereby reducing resource usage and making the computer system operate more efficiently.

A computer program product, in accordance with another aspect of the present invention, includes a computer readable storage medium having program instructions embodied therewith. The program instructions are executable by a computer to cause the computer to perform the foregoing method.

Other aspects of the present invention will become apparent from the following detailed description, which, when taken in conjunction with the drawings, illustrate by way of example the principles of the invention.

BRIEF DESCRIPTION OF THE DRAWINGS

FIG. 6 is a graphical depiction of a table of an illustrative test case correlating four different developers who have submitted a code change request, the factors resulting from analysis of the data relevant to each submission, and the results.

FIG. 8 is a table listing the correlation between each of the buckets in FIG. 7, the actors in FIG. 7, and an impact score determined for each of the actors based on the attributes (data) collected in each bucket.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred aspects of a system, method, and computer program product for enabling human gate free promotion of new code corresponding to a code change request based on analysis of data within a development system.

In one general aspect, a computer-implemented method includes collecting data existing in a development system that relates to the code change request, in response to receiving a code change request to merge new code with existing code. Factors from the collected data are computed for assessing a risk of promoting the new code, the factors including at least: a developer information factor characterizing the developer of the new code, a developer availability factor characterizing an availability of the developer, and an environment health analysis factor characterizing a health of a production environment of the existing code. The factors are processed to compute a confidence score for the code change request. In response to the confidence score being in a first predefined range, the new code corresponding to the code change request is promoted for merging with the existing code, without human intervention. An indication that human intervention is needed before promoting the new code is output in response to the confidence score being in a second predefined range.

In another general aspect, a computer program product includes a computer readable storage medium having program instructions embodied therewith. The program instructions are executable by a computer to cause the computer to perform the foregoing method.

In another general aspect, a system includes a hardware processor and logic integrated with the processor, executable by the processor, or integrated with and executable by the processor. The logic is configured to perform the foregoing method.

Figure 1:
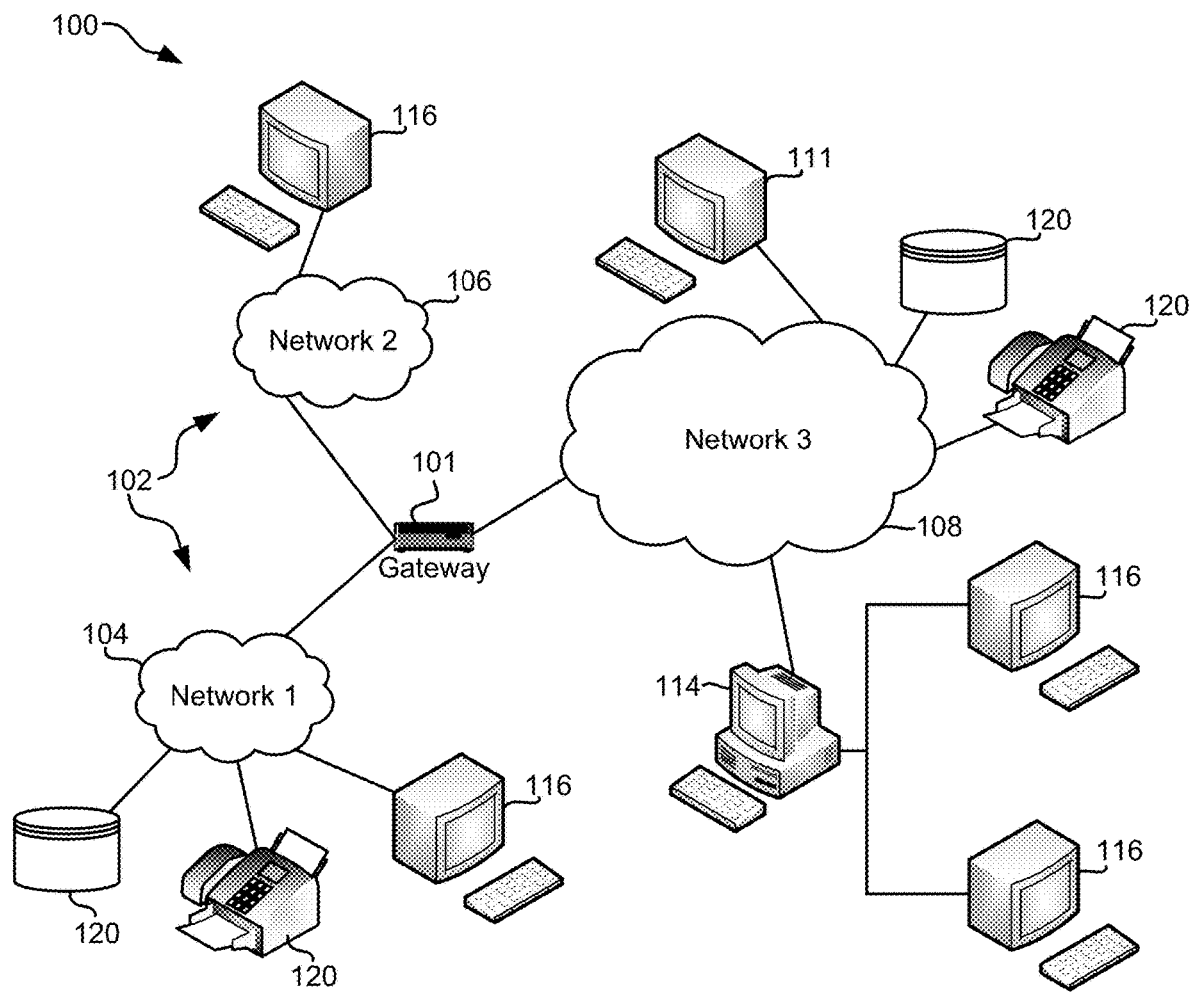
FIG. 1 is a diagram of a network architecture, in accordance with one aspect of the present invention.

FIG. 1 illustrates an architecture 100, in accordance with one aspect. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a local area network (LAN), a wide area network (WAN) such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one aspect.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX® system which emulates an IBM® z/OS® environment (IBM and all IBM-based trademarks and logos are trademarks or registered trademarks of International Business Machines Corporation and/or its affiliates), a UNIX® system which virtually hosts a known operating system environment, an operating system which emulates an IBM® z/OS® environment, etc. This virtualization and/or emulation may be enhanced through the use of VMware® software, in some approaches.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
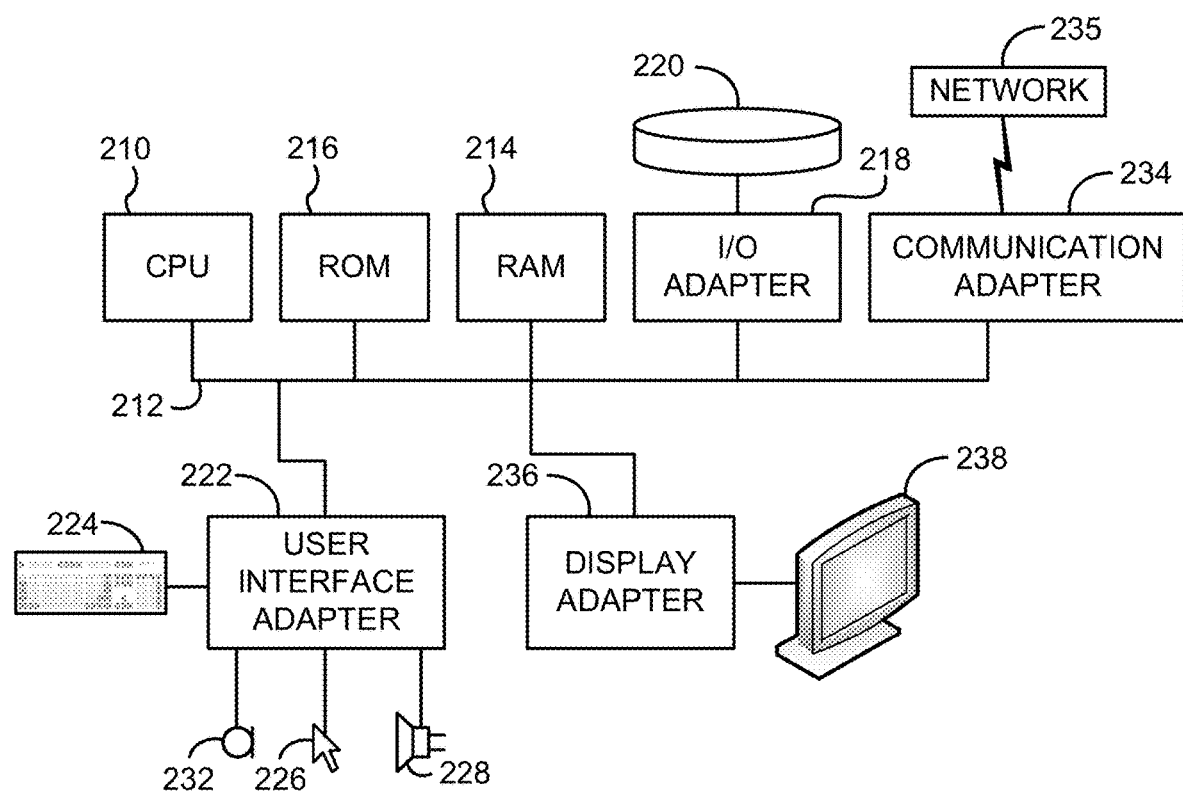
FIG. 2 is a diagram of a representative hardware environment that may be associated with the servers and/or clients of FIG. 1, in accordance with one aspect of the present invention.

FIG. 2 shows a representative hardware environment associated with a user device 116 and/or server 114 of FIG. 1, in accordance with one approach. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an input/output (I/O) adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a macOS®, a UNIX® OS, etc. It will be appreciated that a preferred approach may also be implemented on platforms and operating systems other than those mentioned. A preferred approach may be written using extensible Markup Language (XML), C, and/or C++ language, or other programming languages, along with an object-oriented programming methodology. Object-oriented programming (OOP), which has become increasingly used to develop complex applications, may be used.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some aspects, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various approaches may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

Software and firmware are deployed on computers, portable devices, electronics, etc. Sometimes, it may be desirable to merge supplemental and/or replacement code (hereafter, "new code") with the existing code of the software or firmware. This may be done to change the existing code in some way that resolves a problem. In other cases, the new code may be merged with the existing code to add a feature, improve an existing feature, etc. The following figure depicts an illustrative system for deploying new code.

Figure 3:
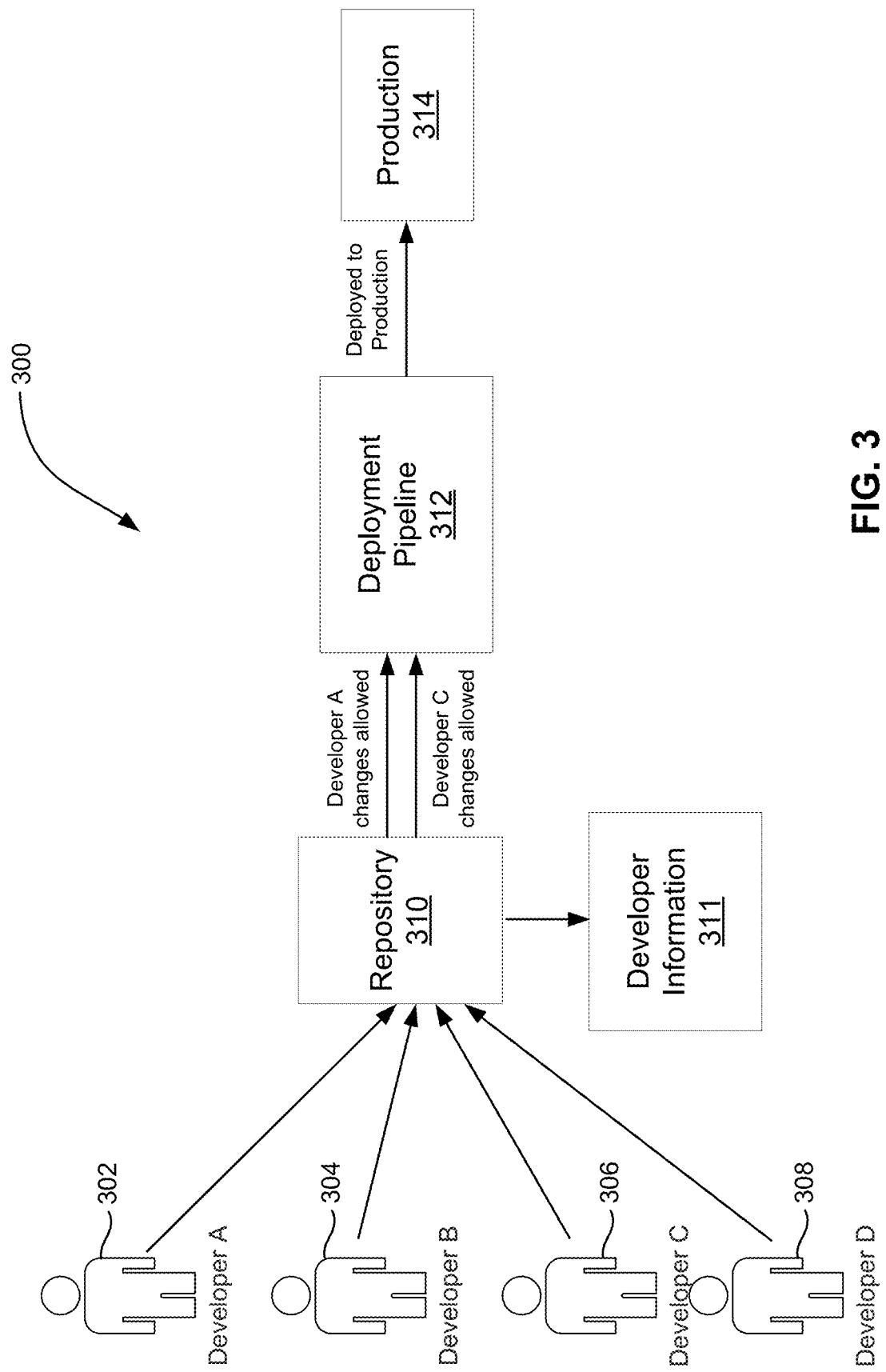
FIG. 3 is a diagram of a system for deploying new code, in accordance with one aspect of the present invention.

FIG. 3 depicts a system 300 for deploying new code, in accordance with one aspect of the present invention. As an option, the present system 300 may be implemented in conjunction with features from any other aspect listed herein, such as those described with reference to the other FIGS. Of course, however, such system 300 and others presented herein may be used in various applications and/or in permutations which may or may not be specifically described in the illustrative aspects listed herein. Further, the system 300 presented herein may be used in any desired environment.

As shown, developers A-D 302-308 create new code.

In some aspects, a developer may be defined as a person, team, entity, etc. that creates the new code. The developer may perform the coding. In some approaches, the developer may also perform other tasks such as quality assurance, automation, etc.

The new code may be submitted via a code change request, such as a pull request, sometimes also referred to as a merge request. Each developer 302-308 issues a unique pull request requesting that the new code be merged into existing code, such as source code, deployed code, etc. In the example shown, the new code is to be merged with source code stored in a project repository 310. Developer A 302 and developer C 306 are authorized developers in this example, e.g., they are listed as authorized developers in a developer information database 311. Because developer A 302 and developer C 306 are authorized, their new code is merged with the source code in the repository and deployed to production 314 with minimal or no human gatekeeping, in this example via a continuous integration and continuous deployment (CI/CD) pipeline 312. Developers A and C may be determined to be authorized in consideration of factors such as developer characteristics, e.g., past check-in history, code review comments, quality of the previous code submissions, etc., as set forth in more detail below.

Note that developer B 304 and developer D 308 are not authorized developers in the developer information database 311. Because they are not authorized, more scrutiny is applied to their pull requests.

Rather than requiring that each and every code change request from developer B 304 and developer D 308 be processed through a human gatekeeping process, the following description describes a system and associated methodology for determining a confidence score indicating that the code change request should be approved without human gatekeeping, or instead should be submitted to human gatekeeping. The confidence score may be based on knowledge in the production system pipeline.

In some aspects, the proposed system leverages existing data within the development system, which in some approaches does not require any additional datasets, in order to achieve the objectives set forth herein. The assessment may begin at any reference point (e.g., submission of an issue, assignment of the task to the developer, etc.) as part of the code promotion activity using baseline data and resulting in a confidence score at various levels, such as change analysis, developer characteristic analysis, test result analysis, availability analysis, environment health analysis, etc.

Figure 4:
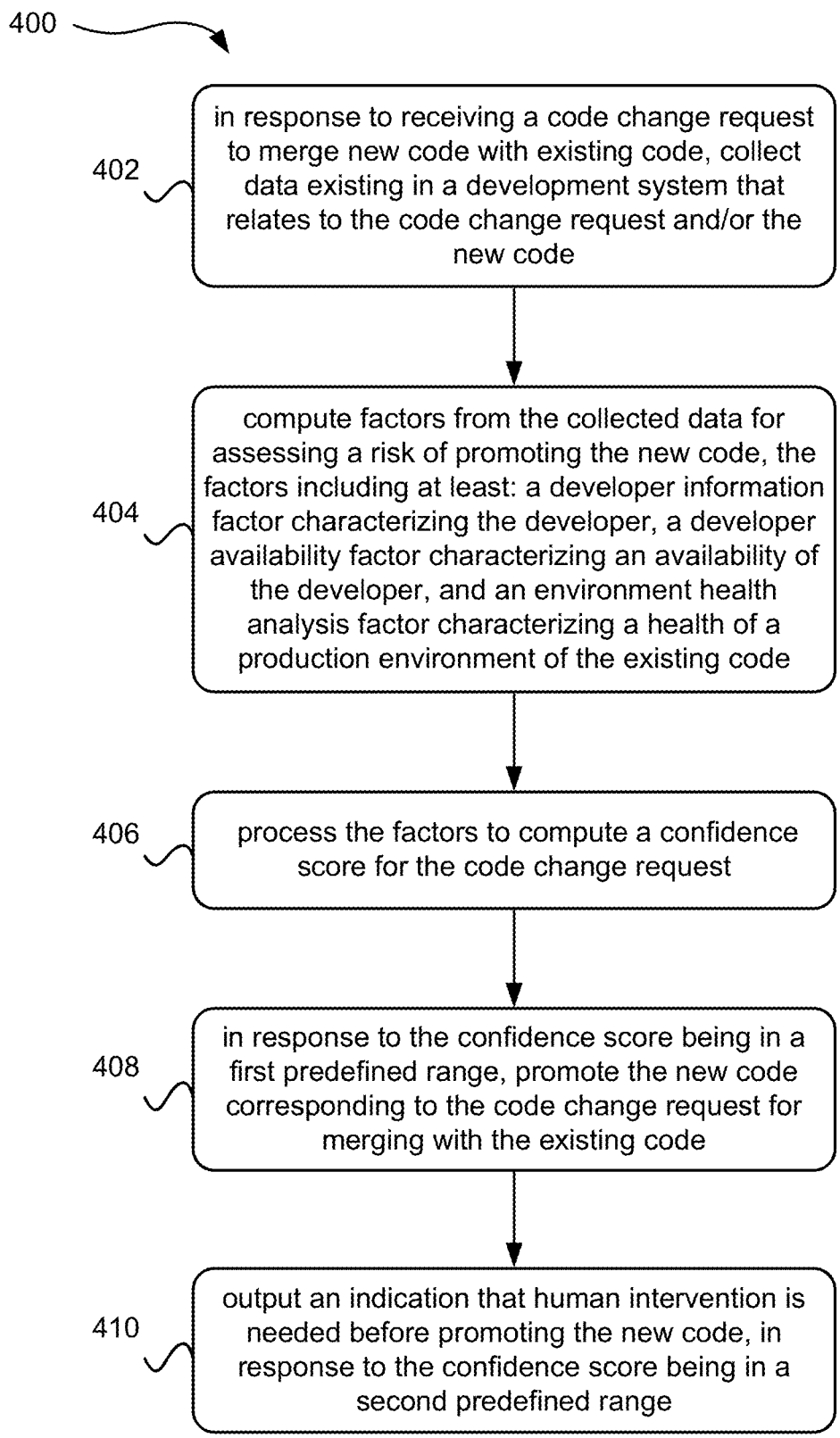
FIG. 4 is a flowchart of a method, in accordance with one aspect of the present invention.

Now referring to FIG. 4, a flowchart of a method 400 is shown, according to one aspect of the present invention. The method 400 may be performed in accordance with the present invention in any of the environments depicted in the other FIGS. Of course, more or fewer operations than those specifically described in FIG. 4 may be included in method 400, as would be understood by one of skill in the art upon reading the present descriptions.

Each of the steps of the method 400 may be performed by any suitable component of the operating environment. For example, in various aspects, the method 400 may be partially or entirely performed by a computer, or some other device having one or more processors therein. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 4, method 400 may initiate with operation 402, where, in response to receiving a code change request to merge new code with existing code, data existing in a development system that relates to the code change request and/or the new code is collected. The code change request may be of any type, such as a pull request. Moreover, the code change request is typically created by a developer that also created the new code, created on behalf of a developer that created the new code, etc.

The data may be collected from tools running in the development system, actors associated with the new code and/or existing code, etc.

In preferred approaches, the collected data includes stored data corresponding to a previous code change request. Thus, this historical data can be used to influence promotion of the present new code. This learning and loopback preferably continues for all new code change requests, and all the new code change requests get influenced by the previous history along with newly computed factors.

In operation 404, factors from the collected data are computed for assessing a risk of promoting the new code, the factors including at least: a developer information factor characterizing the developer, a developer availability factor characterizing an availability of the developer, and an environment health analysis factor characterizing a health of a production environment of the existing code. The factors may additionally and/or alternatively include a change analysis factor characterizing the new code and a type of change requested in the code change request; a test result analysis factor characterizing results of regression testing on the new code; a security scan and compliance analysis factor characterizing results of a security scan and compliance analysis indicating a probability that deployment of the new code would create a security vulnerability and/or a compliance issue, etc.

Any factors that are relevant to computation of the confidence scoring may be used in various approaches. Such factors may include factors that would become apparent to one skilled in the art after reading the present disclosure. The factors may be as simple as a single indication of pass or fail, yes or no, etc. See the example below discussed with reference to FIG. 6. In other approaches, the factors may include a score reflecting a confidence level provided by the analysis engine of the module, e.g., a score on the scale of 1 to 100. In yet other approaches, the factors may be more complex, such as a factor having many components reflecting the underlying data. In yet further approaches, the factors are normalized before being sent to the Intelligent Deployment Engine (IDE), or normalized by the IDE 508. In further approaches, the factors may be labeled data.

In operation 406, the factors are processed to compute a confidence score for the code change request.

In operation 408, in response to the confidence score being in a first predefined range corresponding to a high enough confidence that the new code is ready for deployment without review by a human gatekeeper, the new code corresponding to the code change request is promoted for merging with the existing code.

In operation 410, an indication that human intervention is needed before promoting the new code is output, e.g., for a human gatekeeper to determine whether to promote the new code, in response to the confidence score being in a second predefined range corresponding to a generally lower confidence that the new code is ready for deployment without review by a human gatekeeper, e.g., because the confidence score is not high enough to allow automatic promotion of the new code without human gatekeeper review. The indication may be any indication that would become apparent to one skilled in the art upon reading the present disclosure. For example, the indication may be a flag, a request for human intervention, an alert, etc.

The foregoing method significantly reduces the time between submitting a code change request and promotion of the new code for deployment. For example, by leveraging intelligence derived from within the development system, the human gatekeeping process can be eliminated for some code change requests based on a high confidence score. Accordingly, the inherent delays of such human gatekeeping process are avoided. In other cases where the confidence score is lower because the risks are higher, the normal process can be used, e.g., a production team performs a gatekeeping process to assess the new code prior to promotion.

Preferably, in response to deciding to promote the new code, a timing for promoting the new code is selected based at least in part on data corresponding to the developer availability factor and the environment health analysis factor. Thus, in various aspects, not only is the code quality assessed, but the best recommended maintenance window to promote the code is determined, based at least in part on the health of the system and developer availability.

In some approaches, a request is made for human intervention in response to an inability to compute the confidence score.

In preferred approaches, the new code is promoted to only one particular geographical area for a predetermined period of time before promotion to other geographical areas. This way, in case the new code causes any issues after deployment, promotion of the new code to the other geographical areas can be suspended.

Figure 5:
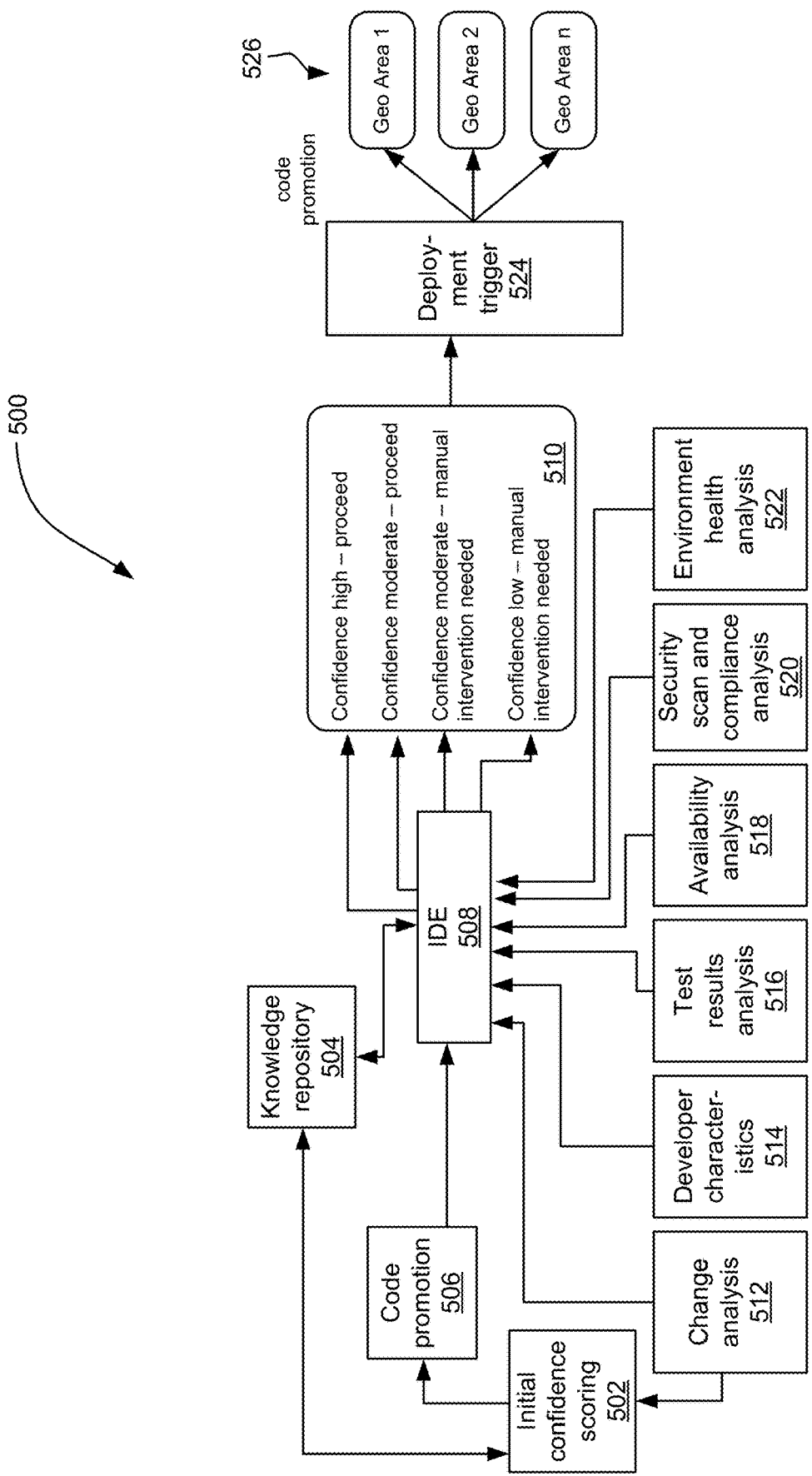
FIG. 5 is a diagram of an architecture for providing human gate free promotion of new code corresponding to a code change request based on analysis of data collected from a development system, in accordance with one aspect of the present invention.

FIG. 5 depicts an architecture 500 for providing human gate free promotion of new code corresponding to a code change request based on analysis of data collected from a development system, in accordance with one aspect of the present invention. As an option, the present architecture 500 may be implemented in conjunction with features from any other approach listed herein, such as those described with reference to the other FIGS. Of course, however, such architecture 500 and others presented herein may be used in various applications and/or in permutations which may or may not be specifically described in the illustrative aspects listed herein. Further, the architecture 500 presented herein may be used in any desired environment.

At module 502, a confidence score for a developer is determined. If this is the first code change request (e.g., pull request) submitted by the developer, the confidence score may be manually entered. Later, the confidence score for the developer may be generated by using a trained machine learning model that takes as input historical information about the developer from the knowledge repository 504, such as a previous confidence score for the developer, previously stored developer characteristic information, etc. New information about the developer, if available, may also be considered when determining the developer confidence score. Preferably, the developer confidence score generation process becomes fully automated at some point, and allows for continuous learning and loopback of information.

A code promotion module 506 collects the code change request and developer-related information (e.g., developer confidence score), and sends that information to an Intelligent Deployment Engine (IDE) 508. Preferably, the code promotion module 506 includes a code hosting platform having functionality for software development and version control. In a particularly preferred approach, the code hosting platform is based on Git, which is a free and open source distributed version control system.

The IDE 508 performs the overall assessment of relevant factors and determines a confidence score 510 for the code change request recommending an automated or a manual gatekeeping of the code change request to the production environment. In the example shown, the confidence score 510 may have one of several different subclassifications indicating a relative level of confidence that merging the new code with existing code will be problem free and/or the risk of merging the new code with existing code. Referring to FIG. 5, illustrative scores 510 are listed from highest confidence/lowest risk to lowest confidence/highest risk, as follows: high confidence, moderate confidence with conscious promotion, moderate confidence with manual intervention, and low confidence. The high confidence and moderate confidence with conscious promotion scores indicate that no manual intervention is needed. The moderate confidence with manual intervention and low confidence scores indicate that manual intervention is needed.

Any factors that are relevant to computation of the confidence scoring may be used in various approaches. Such factors may include factors that would become apparent to one skilled in the art after reading the present disclosure. In the example shown, the factors considered by the IDE 508 include factors provided by a change analysis module 512, a developer characteristic analysis module 514, a test results analysis module 516, an availability analysis module 518, a security scan and compliance analysis module 520, and an environment health analysis module 522. Each of these modules 512-522 and the factor information they provide are described below. Note that some or all of the modules 512-522 may be part of the IDE 510, or may operate separately from the IDE 510.

Preferably, the modules 512-522 collect data existing in a development system that relates to the code change request and/or the new code, and use the data to generate the factors. While specific types of data underlying the factors, and types of information corresponding to the factors, are provided in the examples below, the data collected to create such factors and the resulting factor information may include any data and/or factor information that would become apparent to one skilled in the art after reading the present disclosure.

In some approaches, one or more of the modules may collect the data according to a policy configuration that specifies which data to collect. The policy configuration may initially be created by a human. Preferably, the policy configuration is updated over time by a machine learning engine that learns from the collected data over time and trains itself to update the policy configuration based on predefined parameters such as successes in merging new code with existing code. Any process for such machine learning implementation that would become apparent to one skilled in the art after reading the present disclosure, may be used.

Any technique for collecting the data that would become apparent to one skilled in the art after reading the present disclosure may be used. In another approach, one or more of the modules may collect data using keyword processing to collect the relevant data. In other approaches, the data is collected by performing natural language processing on information in the development system.

Preferably, the data is collected by each module according to the policy configuration. Examples of such information are provided below in the exemplary approaches.

Moreover, the data collected may include data corresponding to a previous code change request, e.g., as stored in the knowledge repository 504. Again, such data may be any type of data that would become apparent to one skilled in the art after reading the present disclosure, such as any of the types of data noted below. Thus, this historical data can be used to influence promotion of the present new code. This learning and loopback preferably continues for all new code change requests, and all the new code change requests get influenced by the previous history along with new results of the analyses.

Moreover, some of the data collected may include factors that were created for a previous code change request and stored in the knowledge repository 504.

Each module may use a classification system to perform classification on the data collected thereby according to predefined attributes. See, e.g., exemplary attributes in FIG. 8.) Classification may be performed by a classifier of any desired type, such as detection trees, support vector machine, random forest, linear regression, etc. to dynamically classify the data and generate the factor information. Preferably, the classification system uses an already-trained classifier. Known techniques may be used to train the initial classifier, e.g., using labeled training data corresponding to the desired outputs. In some approaches, the classification system receives aggregated data and performs classification. In other approaches, the classification system receives data over time, e.g., in real time, periodically, etc.

Any analytics, Artificial Intelligence (AI), and/or Machine Learning (ML) technique known in the art, but trained and/or configured according to the teachings herein, may be used to process the classified data into the factor information. For example, each module 512-522 may be deployed in a trained state as a trained AI model. Training of the AI model, in some approaches, may be performed by applying a predetermined training data set to learn how to process the data. Initial training may include reward feedback that may, in some approaches, be implemented using a subject matter expert (SME) that understands how the data should be processed with respect to the training data. In another approach, the reward feedback may be implemented using techniques for training a Bidirectional Encoder Representations from Transformers (BERT) model, as would become apparent to one skilled in the art after reading the present disclosure. Once a determination is made that the AI model has achieved a redeemed threshold of accuracy during this training, a decision that the model is trained and ready to deploy for use in the associated module is made.

Following is a description of the modules 512-522 shown in FIG. 5. Note that the modules 512-522 shown in FIG. 5 are nonexhaustive and nonexclusive; additional and/or alternate types of modules may be used in various approaches.

The change analysis module 512 provides information about the type of the new code being pushed, what type of change is requested in the code change request, etc. Exemplary factor information includes whether the change is a small change such as a label change, a Cascading Style Sheet (CSS) alignment change, etc.; a large change which involves multiples files, multiple business flows, etc.; a change which also impacts other applications like common micro services, common libraries, etc.; and changes which only involve configuration with no changes in actual functionality or code. Note that a code change request, in various approaches, may include a request to perform the latter type of change, i.e., a change that does not change functionality and/or the existing code itself.

The developer characteristic analysis module 514 provides factor information related to the developer confidence score. For example, such information may include whether the developer is an SME, e.g., an SME for a particular module; whether the developer is an authorized person to push the new code; etc. Other information may include the developer's past history, e.g., how many defects the developer has handled previously and the results of the developer's work; whether and how many review comments have been received regarding the developer and/or the developer's previous new code submissions; how many quality issues have been raised and/or fixed; how many tickets have been raised against the checked in code (e.g., existing code in production); etc. As noted above, if this is the first code change request being submitted by the developer, the initial confidence score input at module 502 may be used as the developer characteristic factor.

The test results analysis module 516 provides information relating to defect classification and/or triaging to ensure no stop ship code issues will be reported against the change if it is delivered. For example, the test results analysis module 516 may run a regression test using the new code for detecting whether and how many total incidents were raised during the test. In another approach, the test results analysis module 516 may receive results of a regression test, e.g., from a quality assurance team. The test results analysis module 516 may classify any incidents to understand how many critical and high impact incidents are raised. Additionally, an estimation may be made as to whether the new code will have a major or moderate impact on the business workflow.

The availability analysis module 518 provides information relating to the speed with which the developer is expected to react if an issue arises upon deployment of the new code. For example, the information may include geographic location-specific information about the developer; the availability of the developer, e.g., based on calendar entries and/or work schedule; a time zone in which the developer is located; present and/or past information about the developer's ability and time to react, e.g., based on developer-provided information, information from the knowledge repository 504 regarding the developer's previous work, etc.; availability of contact information of the developer; whether a backup developer is available in case the developer cannot be reached; etc.

The security scan and compliance analysis module 520 provides information resulting from complete security and compliance scans indicating a probability that deployment of the new code would introduce a security vulnerability and/or a compliance issue. The security scan and compliance analysis module 520 may perform one or both of the scans in some approaches, and may receive results of the scans in other approaches. Information provided by the security scan and compliance analysis module 520 may include whether and how many total compliance issues were raised during the scans. The issues and/or vulnerabilities may be classified to understand how many issues and/or vulnerabilities are found to be critical and/or high. Additionally, an estimation may be made as to whether the new code would have an impact on the business workflow, and if so, the extent of that impact, e.g., high or moderate.

The environment health analysis module 522 provides one or more factors relating to whether the production environment of the existing code is in a healthy enough status for the deployment. Factor information provided by the environment health analysis module 522 may reflect whether there are any critical events pending and yet to be handled, whether there is an outage in the production environment, whether there is a critical issue already running with another team and/or module, etc.

The factors provided by the various modules 512-522 are used by the IDE 508 to calculate the confidence score 510.

The factors may be as simple as a single indication of pass or fail, yes or no, etc. See the example discussed below with reference to FIG. 6. In other approaches, the factors may include a score reflecting a confidence level provided by the analysis engine of the module, e.g., a score on the scale of 1 to 100. In yet other approaches, the factors may be more complex, such as a factor having many components reflecting the underlying data. In yet further approaches, the factors are normalized before being sent to the IDE, or normalized by the IDE 508.

The IDE 508 may compute the confidence score using any analytics, Artificial Intelligence (AI), and/or Machine Learning (ML) technique known in the art, but trained and/or configured according to the teachings herein, may be used to process the classified data into the factor information. For example, an AI model of the IDE 508 may be trained and used in a similar manner as the models described above for the various modules 512-522.

The confidence score is in turn provided to the deployment trigger module 524, which may be programmed to handle the confidence score as follows.

If the confidence score is high, the new code is promoted for merging with the existing code without further intervention.

If the confidence score is moderate with conscious promotion, the new code is likewise promoted for merging with the existing code, and an indication of the promotion is output, e.g., to the development team, due to the possibility of an issue arising, e.g., an issue that lowered the confidence score to this tier.

In either case above, the new code is preferably promoted to a particular geographical area 526 first, for at least a predetermined period of time, before promotion to other geographical areas. This way, in case the new code causes any issues after deployment, promotion of the new code to the other geographical areas is suspended.

Also preferably, the IDE 508 and/or deployment trigger 524 determines the best maintenance window to promote the new code, factoring in the health of the development system and developer availability. Accordingly, the architecture 500, in preferred aspects, does not simply analyze the quality of the new code, but also determines the most opportune time to promote the new code.

If the confidence score is moderate with manual intervention needed or low, the new code is not promoted, but rather manual intervention is requested. The new code is then preferably submitted for human review, e.g., via a conventional human gatekeeping procedure. If the new code passes the gatekeeping, it may be promoted.

Preferably, any data collected by the modules, the factors, and the resulting confidence score are stored in the knowledge repository (unless the data is already stored in the knowledge repository). Thus, this historical data can be used to influence promotion of future new codes. This learning and feedback preferably continues for all new code change requests, and all subsequent code change requests are influenced by the previous history and newly computed factors.

Any process for storing information that would become apparent to one skilled in the art after reading the present disclosure may be used. Likewise, any type of knowledge repository that would become apparent to one skilled in the art after reading the present disclosure may be used.

FIG. 6 is a graphical depiction of a table 600 of an illustrative test case correlating four different developers who have submitted a code change request, the factors resulting from analysis of the data relevant to each submission, and the results. As shown, the factors for each developer include a scoring, here "Passed" and "Failed." The IDE derives a result based on the factor scorings.

As shown, for Developer A, changes will be considered most authorized with high confidence, because all factors are passed, and the associated new code will be promoted without any manual intervention.

For Developer B, the code change request is scored as moderate confidence, but with a conscious promotion because the developer will not be available post deployment, e.g., because the developer is travelling and would not be reachable during deployment, etc.

For Developer C, the code change request is scored with moderate confidence with manual intervention needed. Deployment of the new code is blocked. This may be, for example, a result of factors reflecting Failed because the production server is down resulting in a failed environment health factor, file changes are above some threshold, multiples teams are impacted, etc.

The changes proposed by Developer D are considered least authorized with low confidence, and deployment of the new code is blocked. Instead, the code change request and new code must go through manual intervention. Examples of why the confidence score is low may include that Developer D has a past code change request with multiple review comments for bad code practice, test results show high severity issues, a compliance check is failing, etc.

The factor information and results are preferably stored in the knowledge repository in association with each Developer.

Exemplary Use Case

The following description describes a use case for determining whether a piece of new code can be promoted, e.g., to production and/or for deployment for merging with existing code. Also provided are details about an exemplary operation of the components of the architecture of FIG. 5.

Figure 7:
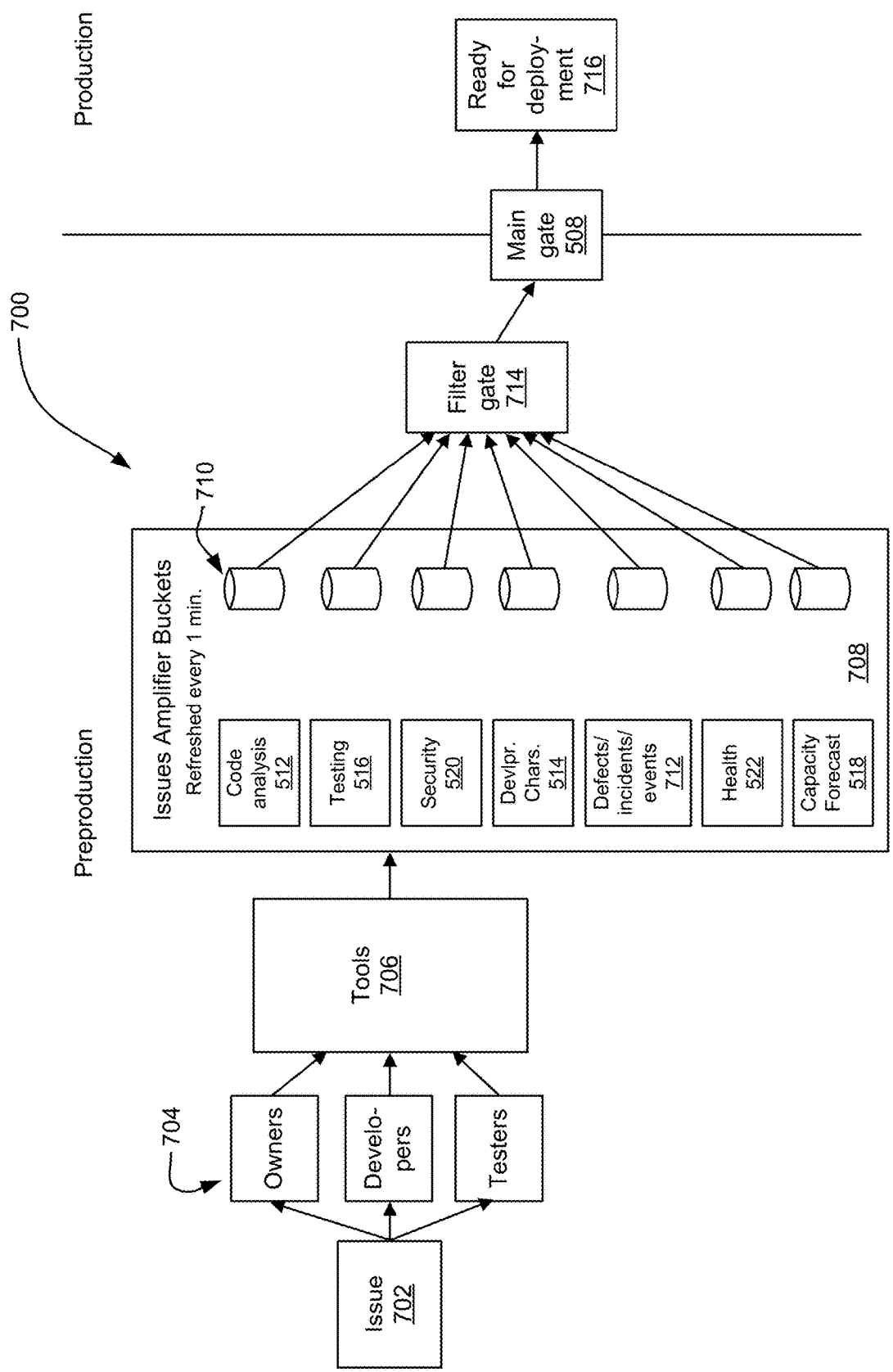
FIG. 7 is a graphical representation of an architecture for a preproduction process upon encountering an issue, in accordance with an exemplary aspect of the present invention.

FIG. 7 depicts a representation of an architecture 700 for a preproduction process upon encountering an issue, in accordance with an exemplary aspect of the present invention. As an option, the present architecture 700 may be implemented in conjunction with features from any other application listed herein, such as those described with reference to the other FIGS. Of course, however, such architecture 700 and others presented herein may be used in various applications and/or in permutations which may or may not be specifically described in the illustrative embodiments listed herein. Further, the architecture 700 presented herein may be used in any desired environment.

As shown, an issue 702, such as an error or misconfiguration in existing code, is raised. The actors 704 involved in resolving the issue 702 may include product owners (e.g., managers), developers, testers, etc. Exemplary tools 706 that are used in the development process, and from which data may be collected include but are not limited to one or more of: code review tools, testing automation tools, security compliance standards, external threats, security tools, service incident tools, infrastructure events, defects raised by testing tools, infrastructure health meter, capacity forecasting tools, DevOps tools, automation tools and DevOps playbooks.

The data from the tools 706, and possibly from the actors 704, are fed into module 708 where the data is sorted into buckets corresponding to the aforementioned factors.

Referring to FIG. 8, there is shown a table 800 listing the correlation between each of the buckets in FIG. 7, the actors 704 in FIG. 7, and an impact score determined for each of the actors based on the data collected according to the predefined attributes and placed in each bucket. As mentioned above, the factors are based on data. In this example, the attributes define the data collected and placed into each bucket, and the data itself are the factors. Preferably, the number and types of attributes for each factor is sufficient to result in an accurate factor value.

The attribute data may be updated frequently, e.g., every minute, every 15 minutes, etc. The attribute data may be updated upon occurrence of an event, e.g., submission of a code change request such as a pull request, upon reporting or detection of an issue, etc.

The specification of each attribute may also specify how the relevant data is collected. For example, the collection of data for a particular attribute may be collected a single time, collected in real time, aggregated, etc. Moreover, the specification may specify collection of historical data, impactful data, etc. Referring to the attributes for developer characteristics, the attributes may be specified as shown in Table 1.

TABLE 1

| | |
|---|---|
| Aggregated | Years of experience, check-in count, role, skills |
| Historical | Modules, defects, Pull Requests (PRs), quality of code |
| Real time | Current quality of code, current PR status |
| Single time | Availability of code check-in |
| Highly Impactful | Leaves, sev1 defects, tools down, connection issue |

Returning to FIG. 7, assume the issue 702 has been raised, and needs to be fixed by a developer as soon as possible. Data is collected from the tools 706 and sorted into the buckets 710 in module 708, e.g., by modules 512-522, 712. The collection characteristics for each type of data are also collected, such as whether the data is aggregated information, real time information, one time information, etc.

An illustrative predefined criterion for amplification of data by each of the modules, presented for demonstration purposes only, include:

Module 512: Number of critical open code review/build issues.

Module 516: Is the testing defect bucket empty?

Module 520: Have any security compliance issues been reported?

Module 514: What is the confidence score of the developer?

Module 712: Number of open defects, incidents, and events.

Module 522: How many infrastructure resources are in a critical or warning state?

Module 518: Has an additional load been reported? How is the performance of the system?

The buckets 710 are preferably issue amplifier buckets. For example, if the particular issue is a highly amplifiable one, then it will immediately move to the filter gate 714 and then the deployment of the code is decided in the main gate.

The modules corresponding to each bucket 710 preferably implement machine learning to amplify certain categories of data based on predefined criteria, such as the severity or priority of the attribute underlying the data. The categories in this example are positive, risk based, neutral, and negative, where positive indicates no detected risk to deployment of the new code, risk based indicates possible risk if the new code is deployed, neutral indicates the possibility of risk if the new code is deployed is low or unknown, and negative indicates a high risk of adverse issues if the new code is deployed. All the amplified issue will be pushed to the filter gate 714.

The filter gate 714 then uses machine learning techniques to determine whether the amplification of the data is correct or not. The outcomes of the analysis by the filter gate 714 in this example include a positive response, a negative response, a risk based response and a neutral response.

If the filter gate 714 determines that the data is neutral, risk based, or negative, the filter gate 714 may submit that particular data to the main gate (IDE) 508. If the filter gate 714 determines that data is positive, the filter gate 714 may stop submission of that particular data to the main gate 508, e.g., because the positively labeled data would not cause the main gate 508 to stop deployment of the new code, and therefore the positive data need not be analyzed by the main gate 508, in some approaches. This reduces the processing required by the main gate 508, thereby reducing resource usage and making the main gate 508 operate more efficiently.

In some approaches, the neutral response may be recharacterized as positive or negative by the filter gate 714, based on other attributes from the same bucket.

Accordingly, the filter gate 714 performs filtering, so that the main gate 508 receives the proper information to make a good decision as to whether the new code can be deployed to the production environment without human intervention, e.g., gatekeeping. See element 716.

Figure 9:
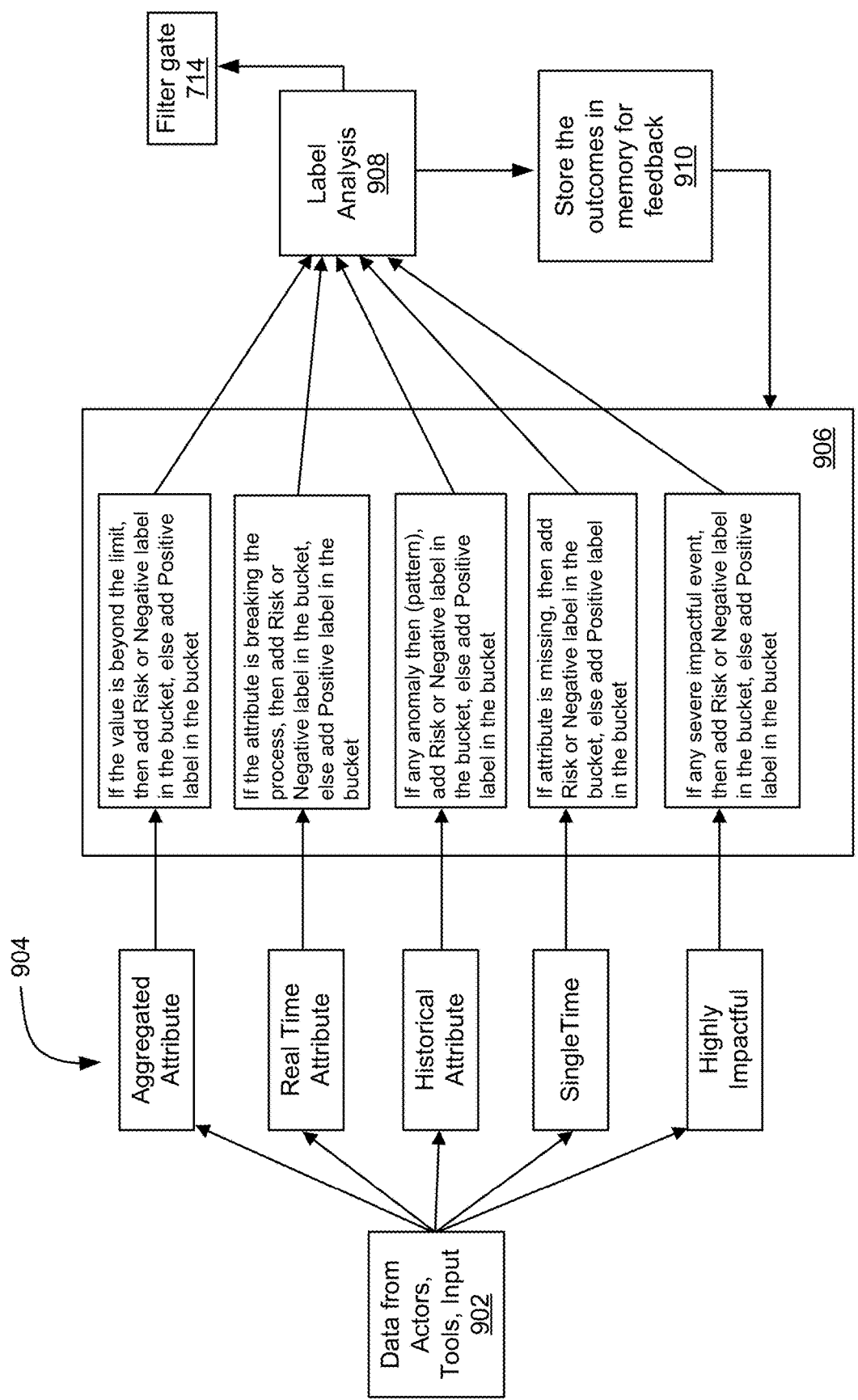
FIG. 9 is a graphical depiction of an example of how a module may label data that is stored in a bucket, for filtering that data before being sent to the filter gate of FIG. 7

FIG. 9 describes how one example of how a module may label data that is stored in a bucket, for filtering that data before being sent to the filter gate 714. As shown, the attribute specifications 904 are applied to the incoming data 902 received from the actors, tools, input, etc. The attribute specifications 904 may be similar to those listed in Table 1 above, such as aggregated attribute, real time attribute, historical attribute, single time attribute, and highly impactful attribute. The data is processed by modules 906 that apply AI processing, e.g., according to predefined criteria, to label the attribute data as positive, neutral, or negative. Again, a neutral attribute can be altered to positive or negative based on other attributes. The AI processing, as well as the predefined criteria, can be of any type that would become apparent to one skilled in the art after reading the present disclosure. Moreover, preferably, each and every piece of data corresponding to each attribute is labeled. Examples of the predefined criteria are shown in FIG. 9.

Preferably, labels are added to each and every attribute by the modules 906, and sent to a label processing module 908, which elevates any drifts to the filter gate, as well as stores the outcomes of the labeling in memory 910 for feedback. The stored outcomes may be used later to determine whether to label an outcome as a neutral, positive or negative.

Figure 10:
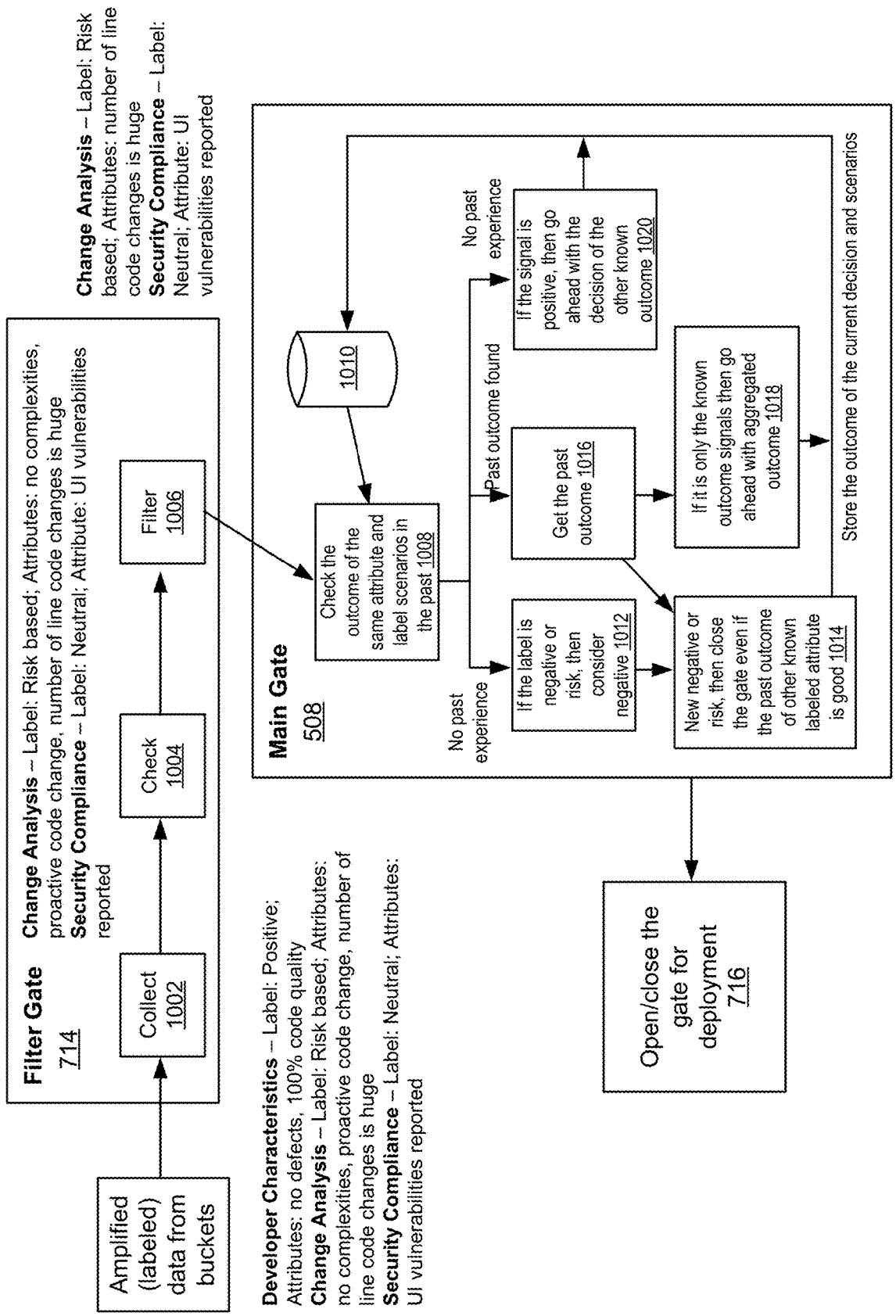
FIG. 10 is a graphical depiction providing further details about exemplary operation of the filter gate and main gate of FIG. 7.

FIG. 10 provides further details about the filter gate 714 and main gate 508 of FIG. 7. The goal is to avoid opening the main gate 508 if the labeled attributes indicate that, based on the data analyzed, the new code is likely problematic. However, if the data is labeled as positive, the data can go to the main gate 508.

The data from the buckets, now labeled as positive, negative, or neutral, is input to the filter gate 714. In this example, assume the developer characteristics attributes are all labeled positive, but some of the change analysis attributes are primarily labeled risk based, while the security compliance attributes labeling is neutral on average.

In the filter gate 714, the attributes and labels are collected in module 1002, and a check is made of the importance and impactfulness of the attributes in module 1004. Because the developer characteristic attributes have a positive label, they are filtered out by module 1006. The positive attributes have no impact on whether the gate is opened or closed in this approach, so they can be safely filtered out by the filter gate 714 to reduce processing by the main gate 508. Recall that the goal is to prevent the gate from opening if the new code will create a problem upon deployment thereof. Therefore, the neutral, risk based and negative attributes are allowed to pass for consideration by the main gate 508.

In the example, only the change analysis and security compliance attributes impact whether the main gate opens, so they are passed to the main gate 508, which decides whether to release the new code for deployment.

In the main gate 508, a module 1008 checks if there is an outcome having the same attributes with the same labels and scenarios in the past, e.g., by querying a knowledge base 1010. If no past outcome is found, and the label is risk based or negative, then the attribute is likely negative. See module 1012. If there is no past experience, module 1014 considers the attribute negative and closes the gate, even if all other attributes are labeled positively.

If a past outcome is found, the past outcome is retrieved by module 1016, and if the past outcome is the only known outcome, then the main gate moves forward with the aggregated outcome in module 1018. If the label is positive, then the main gate moves forward with the decision of the other known outcome in module 1018. Likewise, in module 1014, if a previous outcome was positive, even though the present attribute is labeled negative, then the gate may be opened. If the signal is positive, then the main gate proceeds with the decision of the other known outcome in module 1020.

Based on these decisions for each bucket, the main gate determines whether to promote the new code to deployment. For example, if all of the buckets are associated with positive labeling, then the gate can be immediately opened.

If some of the buckets have enough attributes labeled risk based and/or neutral, the approach shown provides an example of the analysis analytics that helps the main gate decide whether to open the gate or not. For example, if the overall label for one of the buckets is risk based, but based on the past outcome, the risk is not severe enough as determined according to the models used to assess the past outcome, then the main gate can be opened.

Benefits and Practical Applications

There have thus been described systems and methods that make continuous deployment of new code semi-gate free by leveraging recommendations from learning from available data that resides within project management tools.

The methodology presented herein significantly reduces the time between submitting a code change request and promotion of the new code for deployment. For example, by leveraging intelligence derived from within the development system, the human gatekeeping process can be eliminated for some code change requests based on a high confidence score. Accordingly, the inherent delays of such human gatekeeping process are avoided. In other cases where the confidence score is lower because the risks are higher, the normal process can be used, e.g., a production team performs a gatekeeping process to assess the new code prior to promotion.

The methodology presented herein, in some approaches, assesses the developer confidence on issues assigned, test adequacy, and quality in order to derive a confidence score at various stages of the development pipeline in order to compute the larger code promotion confidence score and enable production deployment with the extended association.

In various approaches, the methodology presented herein does not simply analyze the code quality, but it also determines the best recommended maintenance window to promote the code, factoring the health of the system and developer availability. This in turn improves the outcome of the deployment of the new code, especially if there is a problem with the new code.

It will be clear that the various features of the foregoing systems and/or methodologies may be combined in any way, creating a plurality of combinations from the descriptions presented above.

It will be further appreciated that various aspects the present invention may be provided in the form of a service deployed on behalf of a customer to offer service on demand.

The descriptions of the various aspects of the present invention have been presented for purposes of illustration, but are not intended to be exhaustive or limited to the aspects and approaches disclosed. Many modifications and variations will be apparent to those of ordinary skill in the art without departing from the scope and spirit of the described aspects. The terminology used herein was chosen to best explain the principles of the aspects and approaches, the practical application or technical improvement over technologies found in the marketplace, or to enable others of ordinary skill in the art to understand the aspects disclosed herein.

What is claimed is:

1. A computer-implemented method, comprising:
   in response to receiving a code change request to merge new code with existing code, collecting data existing in a development system that relates to the code change request, wherein the collecting includes collecting a plurality of developer information factors characterizing a developer of the new code, a plurality of developer availability factors characterizing an availability of the developer, and a plurality of environment health analysis factors characterizing a health of a production environment of the existing code, wherein the factors included labeled data;
   computing factors from the collected data for assessing a risk of promoting the new code, wherein the computing includes labeling at least: a subset of the plurality of developer information factors characterizing the developer of the new code, a subset of the plurality of developer availability factors characterizing the availability of the developer, and a subset of the plurality of environment health analysis factors characterizing the health of the production environment of the existing code, as having an impact on a confidence score for promoting the new code, wherein the remaining plurality of developer information factors, the remaining developer availability factors and the remaining environment health analysis factors are labeled as having no impact on the confidence score;
   subsequent to the computing, filtering out a subset of the labeled factors that have a label indicating an item has no impact on the confidence score;
   for the labeled factors that have an impact on the confidence score, processing the factors to compute the confidence score for the code change request;
   in response to the confidence score being in a first predefined range, promoting the new code corresponding to the code change request for merging with the existing code, wherein the promoting includes:
      selecting a timing for the automatic promotion of the new code based at least in part on labeled factors; and
      automatically promoting the new code corresponding to the code change request for merging with the existing code during the selected timing.

2. The computer-implemented method of claim 1, wherein selecting the timing for promoting the new code is based at least in part on labeled factors corresponding to the developer availability factor and the environment health analysis factor.

3. The computer-implemented method of claim 1, wherein the factors further include a change analysis factor characterizing the new code and a type of change requested in the code change request.

4. The computer-implemented method of claim 1, wherein the factors further include a test result analysis factor characterizing results of regression testing on the new code.

5. The computer-implemented method of claim 1, wherein the factors further include a security scan and compliance analysis factor characterizing results of a security scan and compliance analysis indicating a probability that deployment of the new code would create a security vulnerability and/or a compliance issue.

6. The computer-implemented method of claim 1, wherein the collected data includes data corresponding to a previous code change request.

7. The computer-implemented method of claim 1, wherein the new code is promoted to only one particular geographical area for a predetermined period of time before promotion to other geographical areas.

8. The computer-implemented method of claim 1, wherein the labeled data that have a positive label are filtered out by the filter gate and thereby not used in the computation of the confidence score.

9. A computer program product, the computer program product comprising a computer readable storage medium having program instructions embodied therewith, the program instructions executable by a computer to cause the computer to:
  collect, by the computer, data existing in a development system that relates to a code change request to merge new code with existing code in response to receiving the code change request, wherein the collecting includes collecting a plurality of developer information factors characterizing a developer on the new code, a plurality of developer availability factors characterizing an availability of the developer, and a plurality of environment health analysis factors characterizing a health of a production environment of the existing code, wherein the factors include labeled data;
  compute, by the computer, factors from the collected data for assessing a risk of promoting the new code, wherein the computing includes labeling at least: a subset of the plurality of developer information factors characterizing the developer of the new code, a subset of the plurality of developer availability factors characterizing the availability of the developer, and a subset of the plurality of environment health analysis factors characterizing the health of the production environment of the existing code, as having an impact on a confidence score for promoting the new code, wherein the remaining plurality of developer information factors, the remaining developer availability factors and the remaining environment health analysis factors are labeled as having no impact on the confidence score;
  subsequent to the compute, filter out a subset of the labeled factors that have a level indicating an item has no impact on the confidence score;
  for the labeled factors that have an impact on the confidence score, process, by the computer, the factors to compute the confidence score for the code change request;
  promote, by the computer, the new code corresponding to the code change request for merging with the existing code in response to the confidence score being in a first predefined range, wherein the promote includes:
    select a timing for the automatic promotion of the new code based at least in part on labeled factors; and
    automatically promote the new code corresponding to the code change request for merging with the existing code during the selected timing.

10. The computer program product of claim 9, further comprising program instructions executable by a computer to cause the computer to select the timing for promoting the new code based at least in part on labeled factors corresponding to the developer availability factor and the environment health analysis factor, in response to deciding to promote the new code.

11. The computer program product of claim 9, wherein the factors further include a change analysis factor characterizing the new code and a type of change requested in the code change request.

12. The computer program product of claim 9, wherein the factors further include a test result analysis factor characterizing results of regression testing on the new code.

13. The computer program product of claim 9, wherein the factors further include a security scan and compliance analysis factor characterizing results of a security scan and compliance analysis indicating a probability that deployment of the new code would create a security vulnerability and/or a compliance issue.

14. The computer program product of claim 9, wherein the collected data includes data corresponding to a previous code change request.

15. The computer program product of claim 9, wherein the new code is promoted to only one particular geographical area for a predetermined period of time before promotion to other geographical areas.

16. A system, comprising:
  a hardware processor; and logic integrated with the processor, executable by the processor, or integrated with and executable by the processor, the logic being configured to:
  collect data existing in a development system that relates to a code change request to merge new code with existing code in response to receiving the code change request, wherein the collecting includes collecting a plurality of developer information factors characterizing a developer on the new code, a plurality of developer availability factors characterizing an availability of the developer, and a plurality of environment health analysis factors characterizing a health of a production environment of the existing code, wherein the factors include labeled data;
  compute factors from the collected data for assessing a risk of promoting the new code, wherein the computing includes labeling at least: a subset of the plurality of developer information factors characterizing the developer of the new code, a subset of the plurality of developer availability factors characterizing the availability of the developer, and a subset of the plurality of environment health analysis factors characterizing the health of the production environment of the existing code, as having an impact on a confidence score for promoting the new code, wherein the remaining plurality of developer information factors, the remaining developer availability factors and the remaining environment health analysis factors are labeled as having no impact on the confidence score;

subsequent to the compute, filter out a subset of the labeled factors that have a level indicating an item has no impact on the confidence score;

for the labeled factors that have an impact on the confidence score, process the factors to compute the confidence score for the code change request;

promote the new code corresponding to the code change request for merging with the existing code in response to the confidence score being in a first predefined range, wherein the promote includes:

select a timing for the automatic promotion of the new code based at least in part on labeled factors; and automatically promote the new code corresponding to the code change request for merging with the existing code during the selected timing.

17. The system of claim 16, wherein the factors further include a change analysis factor characterizing the new code and a type of change requested in the code change request, a test result analysis factor characterizing results of regression testing on the new code, a security scan, and compliance analysis factor characterizing results of a security scan and compliance analysis indicating a probability that deployment of the new code would create a security vulnerability and/or a compliance issue.

18. The system of claim 16, wherein the new code is promoted to only one particular geographical area for a predetermined period of time before promotion to other geographical areas.

* * * * *